Feb. 25, 1936.  L. T. SACHTLEBEN  2,031,858
PHONOGRAPHIC APPARATUS
Original Filed June 1, 1933
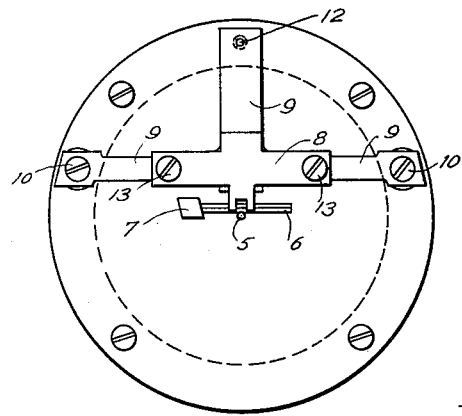
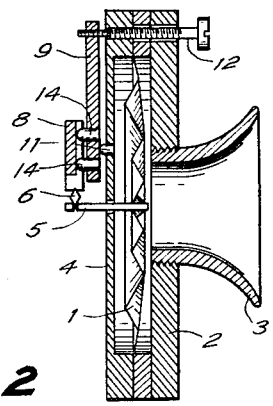
Fig. 1    Fig. 2
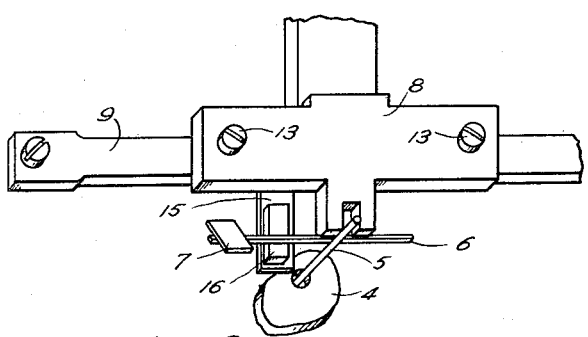
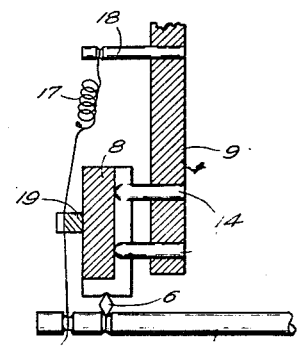
Fig. 3    Fig. 4
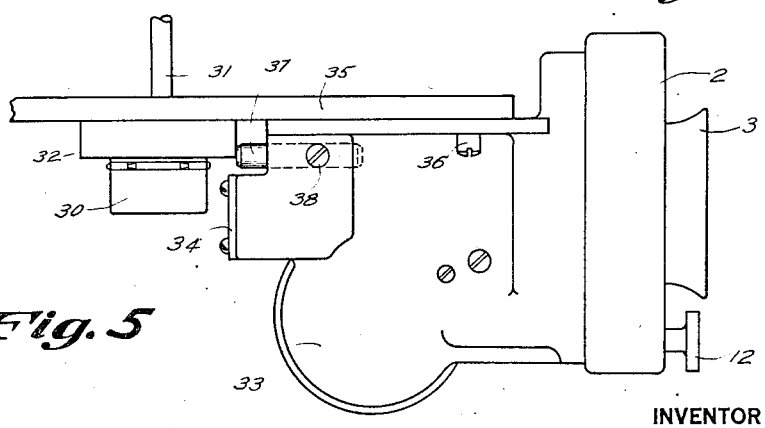
Fig. 5
INVENTOR
LAWRENCE T. SACHTLEBEN
BY
ATTORNEY Patented Feb. 25, 1936

2,031,858

UNITED STATES PATENT OFFICE 2,031,858

PHONOGRAPHIC APPARATUS

Lawrence T. Sachtleben, Camden, N. J., assignor to Radio Corporation of America, a corporation of Delaware Original application June 1, 1933, Serial No. 673,863. Divided and this application November 9, 1934, Serial No. 752,235

4 Claims. (Cl. 274—5)

This invention relates to phonographic apparatus and more particularly, to the variety thereof used for recording sound upon a photographic film.

This application is a division of my application Serial No. 673,863, filed June 1, 1933, now matured into Patent No. 1,983,310.

It involves an improvement in sound recording apparatus wherein the light reflecting mirror is actuated directly by the diaphragm as disclosed in Fritts Patent 1,203,190 and relates more particularly to a number of improvements in the mirror actuating mechanism of such apparatus.

The particular apparatus herein described is especially adapted for use in a camera wherein the operator thereof records his descriptive discussion while taking the picture.

Recording is accomplished by vibrating a narrow line of light transversely of a portion of the film, and this vibration of the line of light is effected by the rotation or oscillation of a vibratable mirror about the axis of its support.

One object of the invention is to effect the axial rotation of the mirror by means of manually controlled adjustment for the purpose of obtaining a zero setting thereof.

Another object of the invention is to provide means for retaining the mirror spindle in predetermined relation to the driving rod of the diaphragm.

Another object of the invention is to provide means for pre-focusing the optical system of the apparatus so that the recording units are interchangeable without further adjustment.

Another object of the invention is to provide means for damping cantilever vibrations of the mirror carrying spindle.

Another object of the invention is to provide means for retaining the driving spindle and mirror spindle in co-operative relation, which will have substantially no effect upon the frequency characteristics of the apparatus.

In the drawing:

Figure 1 is a rear view of a mirror driving mechanism made in accordance with my invention.

Figure 2 is a sectional view along the middle of Fig. 1.

Figure 3 is an enlarged view corresponding to the middle portion of Fig. 1.

Figure 4 is an enlarged view showing a modification of the driving rod and mirror spindle connections.

Figure 5 shows the casing of the recording unit and the means for securing accurate adjustment thereof in relation to the film position.

Referring first to Figs. 1 and 2: A sound-box is provided enclosing the diaphragm 1, which sound-box has a cover 2 fitted with a mouthpiece 3, as well as a rear cover 4. Through the rear cover 4 extends the driving rod 5 which is connected to the diaphragm 1 and vibrated longitudinally thereby. Pivoted against the driving rod 5 is the mirror spindle 6, which is illustrated as a rod diamond-shaped in cross-section but may be of any other suitable form. Carried upon one extremity of the rod 5 is the mirror 7 from which light is reflected to the recording surface.

The other of the acute angles of the diamond-shaped rod is pivoted against the supporting member 8 which forms a fixed pivot therefor.

It will be apparent that sound waves impinging upon the diaphragm will produce longitudinal movement of the rod 5 which will rotate or oscillate the mirror spindle 6 about its pivot in the supporting member 8, and thereby cause shifting of the beam of light which is reflected from the mirror. The optical system for focussing the beam of light upon the mirror and converging it into the form of a narrow line upon the film, is no part of this invention and, so far as this invention is concerned, it is immaterial what form it may take although the general arrangement shown in Taylor Patent 1,847,636 is quite satisfactory. Its construction and arrangement will be readily understood by those skilled in the art.

The member 8 is supported upon the member 9 which in turn is adjustably supported upon the rear face 4 of the sound-box.

The member 9 is, as shown, of a T-shape with the ends of the cross-bar thereof fastened to the cover 4 by the screws 10. The middle of this portion is supported upon the case by the pin 11 which is set into the member 4 and upon which the member 9 can be moved. The screws 10 bend the member 9 very slightly over the member 11 upon which the member 9 is to be rotated by pressure applied at the extremity of the other leg thereof. This rotation is effected by actuation of the screw 12 which is threaded into the member 4 and also into the member 9. As will be seen from Fig. 2, the portion of this screw which is threaded into the member 4 is of relatively large diameter while the portion threaded into the member 9 is of similar diameter, and the pitches of the threads thereon are in correspondence with these diameters. Due to the differential action therebetween, a very fine adjustment of the position of the member 9 can be secured, when the member is held rigidly in such adjustment.

It will be apparent that movement of the screw 12 will accomplish an appropriate movement of the member 8 and thereby effect rotation of the spindle 6 which in turn adjusts the position of the mirror 7.

The member 8, which is provided with notches for pivoting the spindle 6, is secured to the member 9 by the screws 13 which holds it firmly against the pins 14 over which it is slightly flexed to prevent any independent vibration thereof. Since the pins 14 are located in the middle of the member 8 and the screws 13 are located at the ends thereof, the member 8 can be rotated on the pins 14 as a pivot for the purpose of securing proper alignment of the spindle 6, by loosening one of the screws 13 and tightening the other.

There may be some tendency for the spindle 6 to vibrate laterally. Any such vibration may be prevented in the manner shown in Fig. 3 wherein a small arm 15 is attached to the T-bar 9 and extends outwardly therefrom past the spindle 6. A small pad of rubber 16 is secured to the arm 15 and rests lightly against the spindle 6. This block of rubber serves to damp out any cantilever vibrations of the spindle 6 while at the same time it does not interfere with the freedom thereof to rotate.

Fig. 4 shows a slight modification of the construction shown in Fig. 2. In this figure the driving rod 5 is maintained firmly against the spindle 6, and this spindle is in turn maintained securely against the member 8, by the action of a spring 17. This spring 17 is secured to a pin 18 in the member 9 and the end of the spring extends over a spacing block 19 on the member 8. This end of the spring is attached to the member 5 in the groove 20 as shown.

It will be apparent that the spring 17 maintains the elements 5, 6 and 8 in proper relation to each other and, since the tension of the spring is transverse of the rod 5 and the material of the spring is quite flexible, it does not interfere with longitudinal vibration of the member 5.

It will be apparent that other types of vibration-converting means other than the mirror 7 may be used if the construction is applied to other forms of apparatus, and the vibration-translating rod 6 may be of any cross-section functionally equivalent to the diamond-shape shown although the diamond-shape is apparently the most convenient form providing two opposite knife-edges for engagement with the other members.

Referring now to the adjusting means shown in Fig. 5, the drum upon which the film is carried past the recording point is indicated at 30. Thus drum is rotated upon a shaft 31 and coaxial with it is located a bushing 32 of predetermined diameter. This bushing is of annular form, and since the periphery thereof is co-axial with the shaft 31, it may be either merely slid over the said shaft and freely movable therewith, or may be fixed against rotation by attachment to the plate 35. However, since the friction of this bushing 32 with the pin 37 would tend to impede the rotation of the shaft 31, it is generally preferable to attach the bushing to the frame 35. The mirror vibrating mechanism described above is mounted at the right-hand end of the casing 33 as indicated, and this casing 33 contains the exciter lamp and the remainder of the optical system which is of such a nature as to be able to focus the required fine line of light upon a strip of film passing over the drum 30, this line of light passing out of the casing 33 through an aperture in the plate 34.

The casing 33 is secured to a portion of the camera or recorder frame 35 by means of the screw 36 or as many similar screws as may be necessary or desirable, and these screws pass through elongated holes in the casing 33 so that a slight movement of the member 33 toward or away from the sprocket 30 is permitted. In the casing 33 is drilled a hole of appropriate diameter into which is fitted a pin 37 which is secured in place by a screw 38. In manufacturing the device, the casing 33, when the optical system has been completely assembled, is placed in a jig and shifted until the optical system is in correct focus. The pin 37 is then extended until it contacts with a stop member in the jig and is secured firmly in place by tightening the screw 38. By this means the end surface of the pin 37 is maintained in uniform relation to the focal plane of the optical system.

If the bushing 32 is made of appropriate diameter, then when the unit 33 is inserted into the camera and brought to such a position that the pin 37 contacts with the bushing 32, the optical system will be accurately focussed upon a film upon the sprocket 30.

It will be apparent that these recording units are not merely interchangeable with each other but can be exchanged between different recorders or cameras without refocussing.

The scope of this phase of the invention is not limited to directly actuated recording apparatus as, it will be apparent that a recording galvanometer or any equivalent apparatus which is provided with suitable members for abutment against and co-operation with the fixed members of the recording device may be substituted, and the camera or recorder can accordingly be used interchangeably for various purposes, according to which type of device is included therein.

I claim:

1. Phonographic apparatus comprising a drum adapted to support a film and to convey it past a recording or reproduction point, a unitary optical system adapted to focus a beam of light upon the said film at the said recording or reproduction point, a bushing in concentric relation with the said drum, and a member in predetermined co-operative relation with the said optical system adapted to abut against the bushing whereby when said member and said bushing are in abutment, the optical system will be focussed upon the said film.

2. Phonographic apparatus comprising a drum adapted to support a film and to convey it past a recording or reproduction point, a unitary optical system adapted to focus a beam of light upon the said film at the said recording or reproduction point, a bushing in concentric relation with the said drum, and an adjustable member adapted to abut against the first bushing and in predetermined co-operative relation with the said optical system, whereby when said members are in abutment, the optical system will be focussed upon the said film.

3. Phonographic apparatus comprising a drum adapted to support a film and to convey it past a recording or reproduction point, a unitary optical system adapted to focus a beam of light upon the said film at the said recording or reproduction point, a fixed member in predetermined relation to the said drum, and a second member in predetermined co-operative relation with the said optical system adapted to abut against the first member whereby when said members are in abutment, the optical system will be focussed upon the said film.

4. Phonographic apparatus comprising a drum adapted to support a film and to convey it past a recording or reproduction point, a unitary optical system adapted to focus a beam of light upon the said film at the said recording or reproduction point, a fixed member in predetermined relation to the said drum, and an adjustable second member adapted to abut against the fixed member and in predetermined co-operative relation with the said optical system whereby when said members are in abutment the optical system will be focussed upon the said film.

LAWRENCE T. SACHTLEBEN.